United States Patent
Böhnke et al.

(10) Patent No.: US 11,225,545 B2
(45) Date of Patent: *Jan. 18, 2022

(54) TRANSLUCENT POLYURETHANE FOAMS

(71) Applicant: Covestro Deutschland AG, Leverkusen (DE)

(72) Inventors: Lutz Böhnke, Overath (DE); Dirk Achten, Leverkusen (DE); Robert Maleika, Düsseldorf (DE)

(73) Assignee: Covestro Deutschland AG, Leverkusen (DE)

( * ) Notice: Subject to any disclaimer, the term of this patent is extended or adjusted under 35 U.S.C. 154(b) by 63 days.

This patent is subject to a terminal disclaimer.

(21) Appl. No.: 16/498,516

(22) PCT Filed: Mar. 28, 2018

(86) PCT No.: PCT/EP2018/057890
§ 371 (c)(1),
(2) Date: Sep. 27, 2019

(87) PCT Pub. No.: WO2018/178139
PCT Pub. Date: Oct. 4, 2018

(65) Prior Publication Data
US 2020/0040123 A1    Feb. 6, 2020

(30) Foreign Application Priority Data
Mar. 28, 2017  (EP) .................... 17163224

(51) Int. Cl.
*C08G 18/24* (2006.01)
*C08L 75/04* (2006.01)
*C08G 18/42* (2006.01)
*C08G 18/79* (2006.01)
*C08G 18/44* (2006.01)

(52) U.S. Cl.
CPC .......... *C08G 18/246* (2013.01); *C08G 18/42* (2013.01); *C08G 18/44* (2013.01); *C08G 18/798* (2013.01); *C08L 75/04* (2013.01); C08G 2110/00 (2021.01); C08G 2110/0025 (2021.01); C08L 2203/14 (2013.01)

(58) Field of Classification Search
CPC  C08G 2110/0025; C08G 18/44; C08G 18/42; C08G 18/246; C08G 18/798; C08L 75/04
See application file for complete search history.

(56) References Cited

U.S. PATENT DOCUMENTS

| 3,645,979 A | 2/1972 | Liebsch et al. |
| 4,324,879 A | 4/1982 | Bock et al. |
| 4,419,513 A | 12/1983 | Breidenbach et al. |
| 4,795,764 A * | 1/1989 | Alm ................ C08G 18/0852 521/107 |
| 5,053,274 A * | 10/1991 | Jonas .................... E04F 13/18 428/332 |
| 5,212,231 A * | 5/1993 | Woollard ............ C08G 18/246 427/385.5 |
| 5,482,979 A | 1/1996 | Sanders et al. |
| 2009/0075030 A1 | 3/2009 | Kokko et al. |
| 2013/0253084 A1* | 9/2013 | Duggal ................ C08G 18/10 521/124 |

FOREIGN PATENT DOCUMENTS

| DE | 102005042235 A1 | 3/2007 |
| EP | 0010589 A1 | 5/1980 |
| EP | 0047452 A1 | 3/1982 |
| EP | 0629607 A2 | 12/1994 |

OTHER PUBLICATIONS

International Search Report for PCT/EP2018/057602 dated May 29, 2018.
International Search Report for PCT/EP2018/057890 dated May 24, 2018.
Written Opinion of the International Searching Authority for PCT/EP2018/057602 dated May 29, 2018.
Written Opinion of the International Searching Authority for PCT/EP2018/057890 dated May 24, 2018.

* cited by examiner

*Primary Examiner* — Michael L Leonard
(74) *Attorney, Agent, or Firm* — Faegre Drinker Biddle & Reath LLP

(57) ABSTRACT

The present invention relates to specific translucent, preferably lightfast, polyurethane foams which have a high light transmission and are therefore suitable e.g. for producing translucent polyurethane foams or multilayer composite elements, for example for producing structural components, more particularly as roof elements such as strip lights and light domes, as wall elements such as a panel, in vehicles, in lamps, as furniture, as partitions and in sanitary facilities.

14 Claims, No Drawings

TRANSLUCENT POLYURETHANE FOAMS

CROSS-REFERENCE TO RELATED APPLICATIONS

This application is a national stage application (under 35 U.S.C. § 371) of PCT/EP2018/057890, filed Mar. 28, 2018, which claims benefit of European Application No. 17163224.3, filed Mar. 28, 2017, both of which are incorporated herein by reference in their entirety.

The present invention relates to specific translucent, preferably lightfast, polyurethane foams which have a high light transmission and are therefore suitable for example for producing translucent polyurethane foams or multilayer composite elements suitable for example for producing constructional elements, in particular as roof elements such as light bands and skylights, as wall elements such as a panel, in vehicles, in lamps, as furniture, as dividing walls and in sanitary installations.

PRIOR ART

Polyisocyanate-based rigid foams as art interlayer for sandwich structures (molded sandwich sheets) and the use thereof for producing constructional elements are known per se. Translucent foam sheets as wall and ceiling sheets have also been described previously (DE 10 2005 042 235 A1). However, translucency was not achieved by the foams themselves being translucent but rather by light-conducting fibers being incorporated. Such sandwich elements may also be produced with flexible foams, wherein the translucent and/or transparent outerlayers must be stiff or flexible depending on the application. However, the polyurethane and polyisocyanurate foams known from the prior art are not translucent.

Rigid polyurethane and polyisocyanurate foams are typically used for thermal insulation. Such foams are preferably fine-celled and closed-celled and show very low shrinkage and low water absorption.

Translucent polyurethane foams having good light permeability and good thermal insulation characteristics are of interest as materials both for the construction industry and in the interiors and home design sectors. Thermoplastic multiwall sheets based on polymethyl methacrylate and polycarbonate which may also be made to be transparent are sometimes used for this purpose. However, the process of producing multiwall sheets does not allow for the direct production of closed cellular structures, as a result of which yellowing, algal contamination and other effects caused by moisture migration can never be ruled out entirely. In addition, high quality insulation and optical screening are realized only to an extent and achieved only at great cost and complexity, for example by filling the multiwall sheets with silica-based aerogels. Here too, water absorption and volume stability of the filled component are critical. Translucent constructional elements based on silica aerogels or silica xerogels are also costly and complex to produce.

Polyurethane-based forms (also known as PUR foams) having translucent but not transparent properties coupled with thermal insulation properties and based on organic weathering-stable polyurethanes have not yet been described but would satisfy various requirements in a novel combination such as weathering stability, insulation, light permeability, optical screening and color stability.

It is accordingly an object of the present invention to provide a high-translucency polyurethane foam which may be used for producing preferably colorless foam bodies. These foams shall preferably be very largely colorless and thus colorable if required and also thermally stable. It is a further object of the present invention to provide an efficient process for producing translucent, insulating construction materials which satisfy the abovementioned requirements and overcome the abovementioned disadvantages.

It has now been found that, surprisingly, the polyurethane foams according to the invention have a markedly higher light transmission when the individual components are mixed in a substantially bubble-free manner and foamed with a chemical blowing agent. The incorporation of gases, in particular of air, prior to the blowing reaction is to be substantially avoided. Since the turbidity of the reaction mixture is determinatively caused prior to the blowing reaction by scattering of light by microbubbles, it may be used as a measure for the microbubbles formed by incorporated air/gas. The reaction mixture before onset of the blowing reaction should therefore have a turbidity according to DIN EN ISO 7027:2016-11 of less than 3500 NTU, preferably less than 3000 NTU, more preferably less than 2000 NTU and very particularly preferably of less than 1000 NTU.

When the components are mixed in this way the foams according to the invention based on polyurethane foams then have a high light transmission of at least 10% measured at a thickness of 20 mm and good insulation properties, namely a good thermal conductivity preferably of less than 100 mW/(m*K).

The objects are achieved by a process for producing a translucent polyurethane foam by reaction of a component A comprising
- A1 at least one component reactive with the component B and comprising Zerewitinoff-active hydrogen;
- A2 water and/or other chemical blowing agents;
- A3 at least one foam stabilizer;
- A4 optionally auxiliary and/or additive substances;
- A5 optionally at least one flame retardant;
- A6 at least one catalyst; and a component B comprising
- B1 at least one aliphatic or cycloaliphatic polyisocyanate component or a combination thereof, and
- B2 less than 20 parts by weight of an aromatic polyisocyanate component, wherein the parts by weight of B2 are based on the sum of the parts by weight of B1+B2 which are normalized to 100 parts by weight, characterized in that
  the reaction of the component A with the component B is performed at an isocyanate index of 70 to 130 and wherein all parts by weight for components A1 to A6 are normalized such that the parts by weight of A1 to A6 in the composition sum to 100 parts by weight, wherein before onset of the blowing reaction the reaction mixture has a turbidity of less than 3500 NTU, preferably 3000 NTU, more preferably 2000 NM and very particularly preferably of less than 1000 NTU according to DIN EN ISO 7027:2016-11; and
  wherein the obtained translucent polyurethane foam has a light transmission according to EN ISO 13468-2:2006 (400 nm to 800 nm) in the range from 10% to 60%, measured at a layer thickness of the foam of 20 mm, and wherein the obtained translucent polyurethane foam has a haze (haze=100*diffuse transmission/total transmission) according to ASTM D1003-13 of at least 80% measured at a layer thickness of the foam of 20 mm.

A polyurethane foam is to be understood as meaning a foam where the curing of the liquid starting formulation containing isocyanates and polyols with an index of 70 to 130, preferably 85 to 110, particularly preferably 95 to 105, results in a crosslinked polymer in foam form.

In the present invention the terms "substantially no" and "substantially free from" are to be understood as meaning that based on the particular system, mixture or the particular component, the particular feature is present in an amount less than 2% or % by weight, preferably in an amount less than 1% or % by weight, more preferably in an amount less than 0.5% or % by weight, most preferably in an amount less than 0.1% or % by weight or is not present at all.

Commercially available polyurethane foams typically have a translucency of less than 10% at a foam thickness of 20 mm. Without wishing to be bound to a particular theory it is assumed that on account of the small cell sizes compared to the translucent foams and on account of the many cell walls light is scattered strongly, thus causing light transmission to fall sharply due to strong reflection of the incident light at the surface. The cell wall thicknesses of foams known in the prior art are typically 0.01 to 0.04 mm.

Component Comprising Zerewitinoff-Active Hydrogen A1

Polyols contemplated for foams are in particular those used which result in lightfast polyurethane foams upon reaction with aliphatic isocyanates and/or polyisocyanates. Such polyols are, for example, polyacrylate polyols, polyester polyols or polycarbonate polyols or polyether carbonate polyols. Polyether polyols are not preferred since they typically have only limited lightfastness and weathering resistance but may be present to an extent if sufficiently stabilized with light stabilizer. The polyols according to the invention may be employed alone or in combination with typical low molecular weight polyols preferably having a molecular weight of not more than 200 g/mol and/or amines such as for example ethylene glycol, butylene glycol, diethylene glycol, triethylene glycol, polyalkylene glycols such as polyethylene glycol, also 1,2-propanediol, 1,3-propanediol, 1,2-butanediol, 1,3-butanediol, 1,4-butanediol, hexanediol, pentanediol, 3-methyl-1,5-pentanediol, 1,12-dodecanediol, 1,6-hexanediol and isomers, neopentyl glycol or neopentyl glycol hydroxypivalate. The recited polyols are to be understood as exemplary and not exclusive. Also employable in addition are high-functionality polyols such as trimethylolpropane, glycerol, erythritol, pentaerythritol, trimethylolbenzene or trishydroxyethyl isocyanurate. Particularly preferably employable are glycerol, ethylene glycol, diethylene glycol, propylene glycol.

Component A2

Physical and chemical blowing agents are known to those skilled in the field of foams.

The amount of the employed preferably chemical blowing agent A2 depends on the desired density of the foam. Employable blowing agents include for example water, formic acid, halogenated hydrocarbons, esters (in particular methyl formate, ethyl formate, methyl acetate, ethyl acetate) and/or mixtures thereof. The preferred chemical blowing agent is water.

In a preferred embodiment the mixing of the previously degassed components is performed for example in a stirring process while avoiding incorporation of air (and other gases insoluble in the reaction mass/the reaction mixture). In contrast to air and other gases the preferred chemical blowing agents are homogeneously largely dissolved in the reaction mass prior to the reaction and undergo nucleation only during the polymerization reaction. Premature nucleation may be avoided when substantially no gases insoluble in the reaction mass/the reaction mixture are present or these are substantially removed by degassing and their incorporation is avoided. This makes it possible to obtain comparatively coarse but uniform foams according to the invention.

Components A3

Foam stabilizers, in particular silicone surfactants and more preferably siloxane-polyoxyalkylene copolymers and/or polydimethylsiloxane-polyoxyalkylene copolymers.

Component A4

Assistant and additive substances are known to those skilled in the field of foams. In preferred embodiments antioxidants and heat stabilizers may be employed for protection of the foams. Antioxidants are chemical compounds which prevent or delay free-radical degradation and decomposition. These include free radical scavengers having reactive H atoms such as sterically hindered phenols (commercially available as Irganox 1135, for example) or they decompose hydroperoxides (thermooxidative decomposition), for example thioesters (commercially available as PS800). Other useful assistant and additive substances are initiators, pigments, additives and fillers.

Component A5

Non-discoloring flame retardants such as for example triethyl phosphate may likewise be employed in preferred embodiments.

Catalysts A6

The formation of foams from polyol/water mixtures, polyol/water/formic acid mixtures and isocyanate/polyisocyanate requires the use of suitable catalysts. These are known to those skilled in the art.

Exemplarily suitable catalysts are for example ammonium formate, ammonium acetate, ammonium octanoate, tin(II) acetate, tin(II) octoate, tin(II) ethylhexoate, tin(II) laurate, dibutyltin diacetate, dibutyltin dilaurate, dibutyltin maleate, dimethyl tin dineodecanoate, dimethyl tin dioleate, dimethyltin lauryl mercaptide, dioctyltin dineodecanoate, dioctyltin diacetate, bismuth 2-ethylhexanoate, cobalt 2-ethylhexanoate, iron 2-ethylhexanoate, sodium acetate, sodium octoate, sodium ethylhexoate, potassium formate, potassium acetate, potassium ethylhexoate, potassium octoate and mixtures thereof. In order to accelerate the blowing reaction (reaction between water and/or formic acid and isocyanate) it is also possible to additionally employ aminic catalysts, for example 1,8-diazabicyclo[5.4.0]undec-7-ene (DBU), 1,5-diazabicyclo[4.3.0]non-5-ene (DBN) etc. EP 0629607 A2 describes for example the production of a tertiary amino-containing compound and the use thereof as a catalyst.

Polyisocyanate Component B (Also Referred to as Component B)

Starting compounds for the polyisocyanate component B for the process according to the invention are B1 at least one aliphatic or cycloaliphatic polyisocyanate component or a combination thereof and B2 less than 20 parts by weight of an aromatic polyisocyanate component. Isocyanates of this kind are typically prepared by phosgenation, but may also be prepared by a phosgene-free route, for example by urethane cleavage. In a preferred case the products of a specific trimerization of diisocyanates are employed as starting compounds liquid at room temperature (23° C.). Said diisocyanates and the process for producing them are described for example in EP 0010589 A1 and EP 0047452 A1. Alternative synthetic routes are for example the catalytic carbonylation of nitro compounds or amines or the reaction of primary amines with di-tert-butyl Bicarbonate (Diboc) in the presence of 4-(dimethylamino)pyridine (DMAP).

Customary polyurethane foams for use as insulation and sealing materials are typically produced on the basis of mixtures of 4,4'-, 2,4'- and 2,2'-diphenylmethane diisocyanates (MDI) and polyphenylpolymethylene polyisocyanates (p-MDI). However, such foams are neither translucent nor colorfast nor lightfast and have a propensity for severe discoloration. This initial yellowing then often transitions into a brownish discoloration. Therefore commercially available polyurethane foams based on aromatic isocyanates (having a proportion of more than 20% by weight based on the total isocyanate) are per se unsuitable for the production of translucent foams. According to the present invention these can therefore be present only to a maximum proportion of 20 parts by weight based on the total polyisocyanate component B.

The polyisocyanate component B preferably has a viscosity according to DIN EN ISO 3219:1994-10 at 23° C. of 5 to 30 000 mPas, more preferably of 200 to 25 000 mPas, most preferably of 800 to 22 500 mPas.

It is advantageous when at least 70% by weight, in particular 90% by weight, based on the total weight of B of aliphatic polyisocyanates are used. Isocyanurate-containing and/or iminooxadiazinedione-containing polyisocyanates based on 1,6-diisocyanatohexane (HDI) having an NCO content <25% and an average NCO functionality of >2 are advantageous.

For compatibilization, in particular in the presence of polar, chemical blowing agents such as water, at least proportions of hydrophilized isocyanurate-containing polyisocyanates may be employed. Covestro Deutschland AG markets such compounds under the name Bayhydur® for use as crosslinkers in the coatings industry. In particular, the commercially available hydrophilized isocyanate Bayhydur 3100 (NCO content: 17.4%, average NCO functionality: 3.2 (by GPC), monomeric HDI: 0.1%, viscosity (23° C.): 2800 mPas) from Covestro AG is an example of a hydrophilic isocyanurate-containing polyisocyanate based on 1,6-diisocyanatohexane (HDI). Other hydrophilic isocyanate-containing polyisocyanates from other manufacturers are also suitable here. Also conceivable is an in situ production of hydrophilized isocyanates before or during the foaming reaction by addition of suitable mono- or polyfunctional hydrophilic isocyanate-reactive compounds such as for example polyethers, polyesters and sulfonic acid-bearing compounds and other compounds known to those skilled in the art.

Particular preference is given to a polyisocyanate component B having a proportion of monomeric diisocyanates in the polyisocyanate composition B of no more than 50% by weight, advantageously of not more than 25% by weight and particularly advantageously of not more than 10% by weight in each case based on the total weight of the polyisocyanate component B. In a further preferred embodiment the proportion of monomeric diisocyanates is at least 0.01% by weight, preferably at least 0.05% by weight, very particularly preferably at least 0.1% by weight.

Suitable monomeric diisocyanates for the component B are: for example stearyl diisocyanate, dodecyl diisocyanate, decyl diisocyanate, nonyl diisocyanate, octyl diisocyanate, hexamethylene diisocyanate (HDI), pentamethylene diisocyanate (PDI), isophorone diisocyanate (IPDI), 4,4'-diisocyanatodicyclohexylmethane ($H_{12}$MDI), toluene diisocyanate (TDI), diphenylmethane diisocyanates) (4,4'-diphenylmethane diisocyanate, 2,4'-diphenylmethane diisocyanate, 2,2'-diphenylmethane diisocyanate) (MDI), naphthalene-1,5-diisocyanate (NDI), 2,5- and 2,6-bis(isocyanatomethyl)bicyclo[2.2.1]heptane (NBDI), 1,4-butanediisocyanate (BDI).

In a preferred embodiment aliphatic polyisocyanates are employed in >50% by weight, preferably >70% by weight, particularly preferably >90% by weight.

In a further particularly preferred embodiment primarily oligomeric polyisocyanates having a low monomer content are used for the polyisocyanate component B. The oligomeric polyisocyanates present therein are typically obtained by modifying simple aliphatic, cycloaliphatic, araliphatic and/or aromatic monomeric diisocyanates or mixtures of such monomeric diisocyanates. The production of polyisocyanurates, described in U.S. Pat. No. 3,645,979 A for example, is primarily described in the prior art for example as proceeding from liquid monomeric diisocyanates (for example stearyl diisocyanate, dodecyl diisocyanate, decyl diisocyanate, nonyl diisocyanate, octyl diisocyanate, hexamethylene diisocyanate (HDI), pentamethylene diisocyanate (PDI), isophorone diisocyanate (IPDI), 4,4'-diisocyanatodicyclohexylmethane ($H_{12}$MDI), toluene diisocyanate (TDI), diphenylmethane diisocyanates (4,4'-diphenylmethane diisocyanate, 2,4'-diphenylmethane diisocyanate, 2,2'-diphenylmethane diisocyanate) (MDI), naphthalene-1,5-diisocyanate (NDI), 2,5- and 2,6-bis(isocyanatomethyl)bicyclo[2.2.1]heptane (NBDI), 1,4-butanediisocyanate (BDI)), of aliphatic and aromatic nature alike.

Preferred compounds for the polyisocyanate component B are those based on stearyl diisocyanate, dodecyl diisocyanate, decyl diisocyanate, nonyl diisocyanate, octyl diisocyanate, hexamethylene diisocyanate (HDI), pentamethylene diisocyanate (PDI), isophorone diisocyanate (IPDI), 4,4'-diisocyanatodicyclohexylmethane ($H_{12}$MDI), toluene diisocyanate (TDI), 2,5- and 2,6-bis(isocyanatomethyl)bicyclo[2.2.1]heptane (NBDI), 1,4-butane diisocyanate (BDI), blends with the diisocyanate precursors thereof and other compatible and co-soluble isocyanate-functional prepolymers such as uretdiones, biurets, ureas, asymmetric trimers, mixed trimers of different isocyanates and others which are generated in the production of trimeric isocyanurate compounds having a functionality of at least 2 and are known from the Literature.

Particular preference is given to isocyanurate-containing polyisocyanates based on 1,5-diisocyanatopentane (PDI) having an NCO content of 23.2%, 1,6-diisocyanatohexane (HDI) having an NCO content of 21.5%, an average NCO functionality of 3 (according to GPC), a content of monomeric PDI of 0.3% and a viscosity of 13 000 mPas (25° C.) or isocyanurate-containing polyisocyanate based on 1,6-diisocyanatohexane (HDI) having an NCO content of 21.8%, an average NCO functionality of 3.5 (according to GPC), a content of monomeric HDI of 0.1% and a viscosity of 3000 mPas (23° C.) or isocyanurate-containing polyisocyanate based on 1,6-diisocyanatohexane (HDI) having an NCO content of 21.7%, an average NCO functionality of 3.1 (according to GPC), a content of monomeric HDI of 0.1% and a viscosity of 1200 mPas (23° C.) or isocyanurate-containing polyisocyanate based on 1,6-diisocyanatohexane (HDI) having an NCO content of 20.0%, an average NCO functionality of 4.2 (according to GPC), a content of monomeric HDI of 0.2% and a viscosity of 22 700 mPas (20° C.). Likewise preferred is an isocyanurate-containing polyisocyanate based on 1,6-diisocyanatohexane (HDI) having an NCO content of 23.2%, an average NCO functionality of 3.2 (according to GPC), a content of monomeric HDI of 0.2% and a viscosity of 1200 mPas (23° C.), an isocyanurate-containing polyisocyanate based on 1,6-diisocyanatohexane (HDI) having an NCO content of 20%, an average NCO functionality of 4.2 (according to GPC), a content of monomeric HDI of less than 0.25% and a viscosity of 16 000 mPas (23° C.), a hydrophilic isocyanurate-.containing polyisocyanate based on 1,6-diisocyanatohexane (HDI) having an NCO content of 17.4%, an average NCO functionality of 3.2 (according to GPC), a content of monomeric HDI of 0.1% and a viscosity of 2800 mPas (23° C.), an isocyanurate-containing polyisocyanate based on 1,6-diisocyanatohexane (HDI) having an NCO content of 21.7%, an average NCO functionality of 3.5 (according to GPC), a content of monomeric HDI of 0.1% and a viscosity of 3000 mPas (23° C.) and an isocyanurate-containing polyisocyanate based on 1,5-diisocyanatopentane (PDI) having an NCO content of 21.5%, an average NCO functionality of 3 (according to GPC), a content of monomeric PDI of less than 0.3% and a viscosity of 9500 mPas (23° C.).

Unless otherwise stated the average NCO functionality of the component B is determined by gel permeation chromatography (GPC). Functionality is an expression for the number of reactive groups per molecule, i.e. for the number of potential linkage points in the formation of a network. Polyisocyanates, which are formed, for example, in the trimerization of diisocyanates, do not consist of only one defined type of molecule, but comprise a wide distribution of different molecules having different functionalities. For the polyisocyanates, therefore, the average functionality is specified as parameter. The average functionality of polyisocyanates is unambiguously determined by the ratio of number-average molecular weight and equivalent weight and is generally calculated with the aid of the molecular weight distribution determined by gel permeation chromatography.

The oligomeric polyisocyanates may, in accordance with the invention, especially have a uretdione, isocyanurate, allophanate, biuret, iminooxadiazinedione and/or oxadiazinetrione structure. Particular preference is given to polyisocyanates having proportions of isocyanurate groups of >10% by weight, very particularly preferably >20% by weight, in the polyisocyanate component B.

Irrespective of the underlying oligomeric structure (uretdione, isocyanurate, allophanate, biuret, iminooxadiazinedione and/or oxadiazinetrione structure) the polyisocyanate component B for use in the process according to the invention and/or the oligomeric polyisocyanates present therein preferably have an (average) NCO functionality of 2.0 to 6, preferably of 2.3 to 4.0.

Particularly preferred results are achieved when the polyisocyanate component B for use according to the invention has a content of isocyanate groups of 15% to 40% by weight, preferably of 20% to 30% by weight, in each case based on the total polyisocyanate composition B.

Suitable commercially available polyisocyanates are inter alia Desmodur N 3900, Desmodur XP 2675, Desmodur XP 2489, Desmodur N3300, Desmodur N3600 and Desmodur N eco 7300 from Covestro Deutschland AG.

Polyurethanes Foams According to the Invention

In a preferred embodiment the foam thickness of the foam according to the invention perpendicular to the incident light has at least a multiplier of 3, preferably 5 and particularly preferably 10*the cell thickness based on the average cell diameter.

In a further preferred embodiment the foam according to the invention has a lambda value of less than 100 mW/(m*K), preferably of less than 80 mW/(m*K) and especially preferably of less than 60 mW(m*K), most preferably of less than 50 mW/(m*K), measured according to DIN 52616: 1977-11.

In a further preferred embodiment the foam according to the invention has a crystalline proportion of less than 20%, preferably less than 10%, particularly preferably less than 2%. In a particularly preferred embodiment the obtained foams according to the invention contain crystalline proportions whose crystal sizes do not noticeably refract visible light.

General Production Process

Foaming processes are generally carried out either by chemical or physical means. In the production of PUR foams the employed components (A and B) are mixed either via a high pressure mixing or via a low pressure mixing (usually barbed stirrer). In the case of mixtures of different isocyanates these are preferably blended beforehand. The same applies to a mixture of the A components. In preferred embodiments of the prior art air is intentionally incorporated since the micro-airbubbles are nucleation centers and thus help to form a finer-celled foam as is desired for rigid insulation foams in particular.

The light transmission of translucent forms is significantly higher when a bubble-free mixing while avoiding incorporation of gases, in particular air, is used. Bubble-free mixing processes are important in particular for faster-reacting systems since correspondingly less time remains for coalescence of small bubbles to form larger ones.

Bubble-Free Production Process

In a preferred embodiment the foams according to the invention are obtained by a process according to the invention in which the reaction components are mixed in suitable mixing apparatuses while largely avoiding microbubbles having a bubble diameter <0.5 mm. When microbubbles have been largely avoided this is characterized for example by an optically transparent or translucent mixture in contrast to a milky hazy mixture. The fewer microbubbles present in the reaction mixture after mixing, the higher the subsequent light transmission. The microbubbles scatter light and the foam formed therefrom has a lower light transmission. In this regard the turbidity of the reaction mixture may already be determined before onset of the blowing reaction a turbidity according to DIN EN ISO 7027:2016-11, wherein according to the invention the turbidity is less than 3500 NTU, preferably 3000 NTU, more preferably 2000 NTU and very particularly preferably less than 1000 NTU.

According to the invention the absence of air or generally the absence of gaseous nucleating agents results in a markedly coarser-celled foam having a substantially greater light transmission. In contrast to physical blowing agents the gaseous nucleating agents substantially do not dissolve in the reaction mass/the reaction mixture. Should such gaseous nucleating agents be present or have been introduced these may be substantially removed by degassing. Fine-celled foams scatter light more strongly which is deleterious to light transmission.

The present invention relates in particular to the following aspects:

In a first aspect the invention relates to a process for producing a translucent polyurethane foam by reaction of a component A comprising, preferably consisting of, A1 at least one component reactive with the component B and comprising Zerewitinoff-active hydrogen; preferably selected from polyols, such as diols, triols, amines, polyester polyols, polycarbonate diols, polycarbonate polyols, polyether polyols and/or mixtures thereof, more preferably selected from polyester polyols, polyether polyols and/or mixtures thereof;

A2 a chemical blowing agent, preferably water and/or formic acid;

A3 at least one foam stabilizer, preferably at least one silicone surfactant and more preferably siloxane-polyoxyalkylene copolymers and/or polydimethylsiloxane-polyoxyalkylene copolymers;

A4 optionally auxiliary and/or additive substances, preferably at least one component selected from initiator, additives, pigments, fillers, light stabilizers, oxidation inhibitors, UV protectors and/or a combination thereof;

A5 optionally at least one flame retardant, preferably a colorless and non-discoloring flame retardant, preferably triethyl phosphate;

A6 at least one catalyst;

and a component B comprising

B1 at least one aliphatic or cycloaliphatic polyisocyanate component or a combination thereof, and B2 less than 20 parts by weight, preferably less than 10 parts by weight, more preferably less than 5 parts by weight, most preferably less than 1 part by weight, of an aromatic polyisocyanate component, wherein the parts by weight of B2 are based on the sum of the parts by weight of B1+B2 which are normalized to 100 parts by weight, characterized in that the reaction of the component A with the component B is performed at an isocyanate index of 70 to 130, preferably 85 to 120, more preferably 95 to 105, and wherein all parts by weight for components A1 to A6 are normalized such that the parts by weight of A1 to A6 in the composition sum to 100 parts by weight, wherein before onset of the blowing reaction the reaction mixture has a turbidity according to DIN EN ISO 7027:2016-11 of less than 3500 NTU, preferably 3000 NTU, more preferably 2000 NTU and very particularly preferably of less than 1000 NTU; and wherein the obtained translucent polyurethane foam has a light transmission according to EN ISO 13468-2:2006 in the range from 10% to 60%, preferably from 13% to 50% and especially preferably from 16% to 40% measured at a layer thickness of the foam of 20 mm, and wherein the obtained translucent polyurethane foam has a haze (haze=100*diffuse transmission/total transmission) according to ASTM D1003-13 of at least 80%, preferably greater than 90%, more preferably greater than 95% or 98%, most preferably at least 99%, measured at a layer thickness of the foam of 20 mm.

In a second aspect the invention relates to a process according to the preceding aspect, characterized in that the obtained translucent polyurethane foam has a thermal conductivity (measured according to DIN 52616:1977-11) of less than 100 mW/(m*K), preferably of less than 80 mW/(m*K) and especially preferably of less than 60 mW/(m*K), most preferably of less than 50 mW/(m*K).

In a third aspect the invention relates to a process according to any of the preceding aspects, characterized in that the obtained translucent polyurethane foam is colorless to white and has a yellowing index (measured according to ASTM E 313:2015) of less than 20, preferably less than 10, particularly preferably of less than 7 and most preferably of 1.5 to 7, in each case based on a layer thickness of the foam of 20 mm.

In a fourth aspect the invention relates to a process according to any of the preceding aspects, characterized in that the obtained polyurethane foam is in the form of a polyurethane foam having a closed-cell content of at least 40%, preferably at least 50%, more preferably at least 60%.

In addition to light transmission the cell size likewise affects thermal conductivity. Thermal conductivity decreases with decreasing cell size and the abovementioned ranges are preferred. Closed-cell content is determined using a polyurethane or polyisocyanurate foam produced in an open vessel or on a plate after cutting in a thickness of preferably >10*the average cell diameter so that the effect of the bisected cells can be neglected. The determination may be carried out according to DIN EN ISO 4590:1986.

In a fifth aspect the invention relates to a process according to any of the preceding aspects, characterized in that the obtained polyurethane foam moreover has an average cell size between 0.5 mm and 20 mm, more preferably between 1 mm and 15 mm and particularly preferably between 2 mm and 10 mm. Cell size is determined using an optical microscope. The greatest distance between two cell edges is defined as the cell size.

In a sixth aspect the invention relates to a process according to any of the preceding aspects, characterized in that the obtained polyurethane foam has an apparent density of the obtained foam of not more than 300 kg/m$^3$, preferably not more than 200 kg/m$^3$, particularly preferably not more than 100 kg/m$^3$ (determined according to DIN EN ISO 845:2009-10).

In a seventh aspect the invention relates to a process according to any of the preceding aspects, characterized in that the obtained polyurethane foam has an average cell wall thickness of at least 0.05 mm, preferably at least 0.2 mm, particularly preferably at least 0.3 mm, it additionally being most preferable when the maximum cell wall thickness is 0.6 mm. The cell wall thickness was determined using an optical microscope. The cell wall thickness was defined as the thickness of a cell wall centrally between two nodes.

In an eighth aspect the invention relates to a process according to any of the preceding aspects, characterized in that 65 to 99.2 parts by weight, preferably 75 to 99 parts by weight and particularly preferably 80 to 98 parts by weight, of A1;

0.5 to 8 parts by weight, preferably 1 to 7 parts by weight, more preferably 1.5 to 5 parts by weight, most preferably 2 to 3 parts by weight, of A2;

0.1 to 5 parts by weight, preferably 0.15 to 3 parts by weight, more preferably 0.2 to 0.15 parts by weight, of A3;

0 to 60 parts by weight, preferably 0 to 40 parts by weight and particularly preferably 0 to 25 parts by weight, of A4 are present.

In a ninth aspect the invention relates to a process according to any of the preceding aspects, characterized in that 0 to 25 parts by weight, preferably 0 to 22 parts by weight, especially preferably 0 to 20 parts by weight, of A5 are present; and 0.2 to 4 parts by weight, preferably 0.3 to 3 parts by weight, especially preferably 0.4 to 2 parts by weight, of A6 are present.

In a tenth aspect the invention relates to a process according to any of the preceding aspects, characterized in that mixing of degassed components and/or substantially no incorporation of air (and other gases) take place.

In an eleventh aspect the invention relates to a translucent polyurethane foam obtained by a process according to the preceding aspects.

In a twelfth aspect the invention relates to a multilayer composite element in which the translucent polyurethane foam according to aspect 11 is arranged between two, preferably translucent and/or transparent, elements or two translucent polyurethane foam layers surround a transparent and/or translucent element.

In a thirteenth aspect the invention relates to a multilayer composite element according to aspect 12, characterized in that the one or the two, preferably translucent and/or transparent, elements are woven fabrics, non-crimp fabrics, knitted fabrics, films or sheets, particularly preferably made of the materials glass, polymethylmethacrylate or polycarbonate, it being most preferable when both elements are made of the same material or from different material.

In a fifteenth aspect the invention relates to the use of the translucent polyurethane foam according to aspect 11 or of the multilayer composite element according to aspect 12 or 13 as a constructional element, in particular as a roof element such as a light band, a skylight, as a wall element such as a panel, in vehicles, in lamps, as furniture, as dividing walls or in sanitary installations.

EXAMPLES

In what follows the present invention is more particularly elucidated with reference to examples but is in no way limited thereto:
Components Used:
Catalysts
Dibutyltin dilaurate
DBU (1,8-diazabicyclo[5.4.0] undec-7-ene)
Employed Compounds A):
Desmophen C1100: (difunctional ester carbonate diol having a viscosity of 3200±1300 mPa*s (at 23° C.),
LS2328: (Difunctional polyester polyol having an OH number of 755 (mg KOH/g)) Foam stabilizers (polyester-polydimethylsiloxane copolymers):
Tegostab B8421
Employed Isocyanates and Polyisocyanates B)
Desmodur N3900: (iminooxadiazinedione)
Stabilizers Irganox 1135:

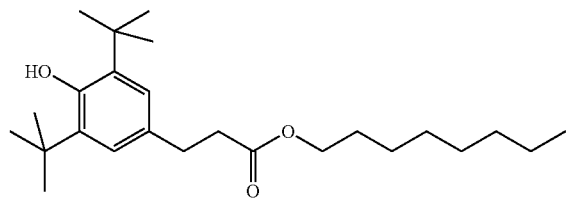

Irganox PS800

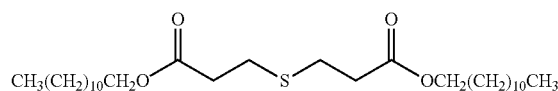

Methods of Measurement Used:
The coefficients of thermal conductivity were determined according to DIN 52616: 1977-11 using foams having a thickness of 30 mm.
Light transmission was determined according to EN ISO 13468-2:2006 using foams having a thickness of 20 mm unless a different thickness is explicitly specified.
Cell size and cell wall thickness were measured as described hereinabove using an optical microscope.
The yellowing index, also referred to hereinbelow merely as Y1, was determined according to ASTM E 313:2015.
The turbidity of the reaction mixtures was determined according to DIN EN ISO 7027:2016-11.

Comparative Example 1a and Example 1b

An isocyanate-reactive composition composed of 65.15 g of Desmophen C1100, 0.17 g of Irganox 1135, 0.17 g of Irganox PS800, 1.75 g of water, 0.13 g of the catalyst dibutyltin dilaurate and 0.25 g of the catalyst DBU was processed with 57.4 g of Desmodur N3900 as described hereinbelow:

a) The abovementioned substances were mixed for 60 seconds at 2800 rpm and a raw material temperature of 23° C. with a Pendraulik laboratory stirrer and the reaction mixture was carefully poured into a mold. The foam had set after 2 h.
b) The abovementioned substances were mixed for 30 seconds at 2750 rpm and a raw material temperature of 23° C. with a Speedmixer and the reaction mixture was carefully poured into a mold. The foam had set after 2 h.

The following light transmissions were determined according to EN ISO 13468-2 on foams of 20 mm in thickness:

| 1a) Pendraulik | 1b) Speedmixer |
| --- | --- |
| 3.4% | 17.4% |
| Initial turbidity after mixing: 3626 NTU | Initial turbidity after mixing: 388 NTU |

Comparative Example 2a and Example 2b

An isocyanate-reactive composition composed of 48.02 g of LS2328, 0.17 g of Irganox 1135, 1.75 g of water, 0.16 g of foam stabilizer Tegostab 138421 and 0.09 g of catalyst dibutyltin dilaurate, 0.19 g of catalyst DBU was processed with 74.79 g of Desmodur N3900 as described hereinbelow:

c) The abovementioned substances were mixed for 60 seconds at 2800 rpm and a raw material temperature of 23° C. with a Pendraulik laboratory stirrer and the reaction mixture was carefully poured into a mold. The foam had set after 2 h.
d) The abovementioned substances were mixed for 30 seconds at 2750 rpm and a raw material temperature of 23° C. with a Speedmixer and the reaction mixture was carefully poured into a mold. The foam had set after 2 h.

The following light transmissions were determined according to EN ISO 13468-2 on foams of 15 or 20 mm in thickness:

| 2a) Pendraulik (15 mm)* | 2b) Speedmixer (20 mm) |
| --- | --- |
| <2.0% | 19.1% |
| Initial turbidity after mixing: 4500 NTU | Initial turbidity after mixing: 330 NTU |

*at a 20 mm thickness of the foam produced by conventional means (Pendraulik stirrer) the light transmission of this fine-celled, white foam was too low and the thickness therefore had to be reduced to 15 mm in order to be able to perform a measurement.

The thermal conductivity of example 2b measured according to DIN 52616 is 55 mW/mK.
The Speedmixer DAC 150 FAZ mixing apparatus mixes the components in a largely bubble-free manner while mixing with the laboratory stirrer IKA-RW20 or the laboratory stirrer from Pendraulik brings about incorporation of air. The measured high turbidity of the reaction mixture upon mixing with the Pendraulik IKA-RW20 laboratory stirrer is also apparent from the light transmission of the foams.

A Pendraulik mixer at 2800 rpm incorporates air into the reaction mixture. An "eddy/vortex" is formed and a large mixing surface with air is formed during mixing, thus resulting in an undesired introduction of air.

In a Speedmixer the constituents are mixed in a tumbling rotational motion. As well as effecting low surface area mixing, air, the constituent of lower density, is also expelled from the mixture by the centrifugal force.

The invention claimed is:

1. A process for producing a translucent polyurethane foam by reacting a component A comprising
    A1 at least one component reactive with the component B and comprising Zerewitinoff-active hydrogen;
    A2 water and/or other chemical blowing agents;
    A3 at least one foam stabilizer;
    A4 optionally auxiliary and/or additive substances;
    A5 optionally at least one flame retardant;
    A6 at least one catalyst;
    and a component B comprising
    B1 at least one aliphatic or cycloaliphatic polyisocyanate component and/or a combination thereof, and
    B2 less than 20 parts by weight of an aromatic polyisocyanate component, wherein the parts by weight of B2 are based on the sum of the parts by weight of B1+B2 which are normalized to 100 parts by weight, wherein the reaction of the component A with the component B is performed at an isocyanate index of 70 to 130 and wherein all parts by weight for components A1 to A6 are normalized such that the parts by weight of A1 to A6 in the composition sum to 100 parts by weight, wherein before onset of the blowing reaction the reaction mixture has a turbidity of less than 3500 NTU measured according to DIN EN ISO 7027:2016-11; and
    wherein the obtained translucent polyurethane foam has a light transmission according to EN ISO 13468-2:2006 in the range from 10% to 60% measured at a layer thickness of the foam of 20 mm, and wherein the obtained translucent polyurethane foam has a haze (haze=100*diffuse transmission/total transmission) according to ASTM D1003-13 of at least 80% measured at a layer thickness of the foam of 20 mm.

2. The process as claimed in claim 1, wherein the obtained translucent polyurethane foam has a thermal conductivity measured according to DIN 52612:2-1984-06 of less than 100 mW/(m*K).

3. The process as claimed in claim 1, wherein the translucent polyurethane foam is colorless to white and has a yellowing index measured according to ASTM E 313:2015 of less than 10 based on a thickness of the foam of 20 mm.

4. The process as claimed in claim 1, wherein the polyurethane foam is in the form of a polyurethane foam having a closed-cell content of at least 40%.

5. The process as claimed in claim 1, wherein the polyurethane foam moreover has an average cell size between 0.5 mm and 20 mm.

6. The process as claimed in claim 1, wherein the polyurethane foam has an apparent density of the obtained form of not more than 300 kg/m$^3$, determined according to DIN EN ISO 845:2009-10.

7. The process as claimed in claim 1, wherein the polyurethane foam has an average cell wall thickness of at least 0.05 mm.

8. The process as claimed in claim 1, wherein
    65 to 99.2 parts by weight of A1;
    0.5 to 8 parts by weight of A2;
    0.1 to 5 parts by weight of A3;
    0 to 60 parts by weight of A4, are present.

9. The process as claimed in claim 1, wherein
    0 to 25 parts by weight of A5;
    0.2 to 4 parts by weight of A6 are present.

10. The process as claimed in claim 1, wherein mixing of degassed components take place.

11. A translucent polyurethane foam obtained by a process of claim 1.

12. A multilayer composite element in which the translucent polyurethane foam as claimed in claim 11 is arranged between two elements.

13. The multilayer composite element as claimed in claim 12, wherein the one or the two elements are nonwoven fabrics, non-crimp fabrics, knitted fabrics, films or sheets.

14. An article comprising the translucent polyurethane foam as claimed in claim 11 wherein the article is selected from the group consisting of a constructional element, a wall element, a vehicles, a lamps, furniture, a a dividing wall, and sanitary installations.

* * * * *